(12) United States Patent
Araki et al.

(10) Patent No.: US 7,412,821 B2
(45) Date of Patent: Aug. 19, 2008

(54) CONTROL APPARATUS FOR INTERNAL COMBUSTION ENGINE

(75) Inventors: Koji Araki, Toyota (JP); Yoshiyuki Shogenji, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 269 days.

(21) Appl. No.: 11/340,700

(22) Filed: Jan. 27, 2006

(65) Prior Publication Data

US 2006/0207240 A1     Sep. 21, 2006

(30) Foreign Application Priority Data

Mar. 18, 2005  (JP) ............................. 2005-078359

(51) Int. Cl.
*F01N 3/00* (2006.01)
*F01N 3/10* (2006.01)

(52) U.S. Cl. .............................. 60/284; 60/286; 60/295; 60/300; 60/303

(58) Field of Classification Search .................. 60/284, 60/286, 295, 300; 123/275, 276, 299, 431, 123/590
See application file for complete search history.

(56) References Cited

U.S. PATENT DOCUMENTS

| | | | | |
|---|---|---|---|---|
| 4,031,867 A | * | 6/1977 | Yasuda et al. ............... 123/430 |
| 4,165,610 A | * | 8/1979 | Iizuka et al. .................... 60/284 |
| 5,211,011 A | * | 5/1993 | Nishikawa et al. ............. 60/284 |
| 5,343,702 A | * | 9/1994 | Miyajima et al. ............. 60/285 |
| 5,482,023 A | * | 1/1996 | Hunt et al. .................... 123/491 |
| 6,301,888 B1 | * | 10/2001 | Gray, Jr. ..................... 60/605.2 |
| 6,470,682 B2 | * | 10/2002 | Gray, Jr. ..................... 60/605.2 |
| 6,543,412 B2 | * | 4/2003 | Amou et al. ................. 123/337 |
| 6,557,521 B2 | | 5/2003 | Ichihara et al. |
| 6,606,976 B2 | | 8/2003 | Nagano et al. |
| 6,813,880 B2 | * | 11/2004 | Nishiyama et al. ............ 60/285 |
| 7,017,556 B2 | | 3/2006 | Borg et al. |
| 2005/0016500 A1 | | 1/2005 | Miyazaki et al. |
| 2005/0109020 A1 | * | 5/2005 | Ichise et al. .................... 60/285 |
| 2005/0120709 A1 | * | 6/2005 | Ichise et al. .................... 60/285 |
| 2005/0155344 A1 | * | 7/2005 | Kobayashi .................... 60/286 |
| 2005/0268891 A1 | | 12/2005 | Nagano et al. |
| 2006/0207241 A1 | * | 9/2006 | Araki et al. .................... 60/284 |

FOREIGN PATENT DOCUMENTS

| | | |
|---|---|---|
| EP | 1 138 901 | 10/2001 |
| EP | 1 223 327 | 7/2002 |
| EP | 1 500 807 | 1/2005 |
| JP | A 11-324765 | 11/1999 |

* cited by examiner

*Primary Examiner*—Thomas Denion
*Assistant Examiner*—Loren Edwards
(74) *Attorney, Agent, or Firm*—Oliff & Berridge, PLC

(57) ABSTRACT

An engine ECU executes a program including the step of performing an operation for rapid catalyst warm-up, under the conditions that an engine is started and rapid catalyst warm-up is necessary, by setting the ratio of fuel injection by an in-cylinder injector to be equal to or higher than that of an intake manifold injector and retarding the ignition timing to a large degree, and the step of performing normal operation under the condition that the catalyst is warmed up to be activated.

14 Claims, 5 Drawing Sheets

FIG. 3

| | RAPID CATALYST WARM-UP CONTROL | |
|---|---|---|
| IGNITION TIMING | RETARD TO A LARGE DEGREE | DECREASE IN UNBURNED HC, INCREASE IN EXHAUST TEMPERATURE |
| IGNITION TIMING OF IN-CYLINDER INJECTOR | INJECT IN COMPRESSION STROKE | RICH AIR-FUEL RATIO NEAR SPARK PLUG, SEMI-STRATIFIED CHARGE COMBUSTION |
| FUEL QUANTITY | DECREASE | DECREASE IN UNBURNED HC |
| AIR QUANTITY | INCREASE RELATIVE TO IDLING | AVOID TORQUE DOWN |
| DI RATIO r | r = 0.5～0.65 | RICH AIR-FUEL RATIO NEAR SPARK PLUG, SEMI-STRATIFIED CHARGE COMBUSTION |

CONTROL APPARATUS FOR INTERNAL COMBUSTION ENGINE

This nonprovisional application is based on Japanese Patent Application No. 2005-078359 filed with the Japan Patent Office on Mar. 18, 2005, the entire contents of which are hereby incorporated by reference.

BACKGROUND OF THE INVENTION

1. Field of the Invention

The present invention relates to a control apparatus for an internal combustion engine including a first fuel injection mechanism (in-cylinder injector) for injecting fuel into a cylinder and a second fuel injection mechanism (intake manifold injector) for injecting fuel into an intake manifold or intake port. In particular, the invention relates to a control apparatus for an internal combustion engine for use in the case where a catalyst for cleaning exhaust gases is rapidly warmed up.

2. Description of the Background Art

An internal combustion engine is well-known that includes an intake manifold injector for injecting fuel into an engine intake manifold and an in-cylinder injector for injecting fuel into an engine combustion chamber, for which the ratio of fuel injection between the intake manifold injector and the in-cylinder injector is determined based on an engine speed and an engine load.

Japanese Patent Laying-Open No. 11-324765 discloses a control apparatus for a direct-injection spark-ignition internal combustion engine that activates, at an early stage after engine start, a catalyst for cleaning exhaust gases. This control apparatus for the direct-injection spark-ignition internal combustion engine includes a fuel injection valve for injecting and supplying fuel directly into a combustion chamber of the engine, fuel supply means for creating a homogeneous air-fuel mixture in the entire combustion chamber, and a spark plug for producing a spark to ignite the air-fuel mixture within the combustion chamber. The direct-injection spark-ignition internal combustion engine is controlled in such a manner that the quantity of injected fuel and the fuel injection timing of the fuel injection valve in a compression stroke as well as the ignition timing of the spark plug are controlled such that the air-fuel ratio of an air-fuel mixture layer locally located around the spark plug when the mixture is ignited is stoichiometric under a predetermined engine operating condition, and accordingly stratified charge combustion is performed. The control apparatus further includes temperature-increase condition determination means for making a determination as to the condition under which an exhaust cleaning catalyst provided in an exhaust manifold of the engine should be increased in temperature as well as control means for controlling, under the condition where the exhaust cleaning catalyst should be increased in temperature, the quantity of fuel injected by the fuel supply means so as to allow the air-fuel ratio of the air-fuel mixture generated in the whole combustion chamber to be lean rather than stoichiometric and to be an air-fuel ratio at which flame can be propagated, and controlling the quantity of injected fuel and the fuel injection timing of the fuel injection valve in a compression stroke and the ignition timing of the spark plug so as to allow the air-fuel ratio of the air-fuel mixture locally located around the spark plug when the mixture is ignited to be rich rather than stoichiometric, thereby achieving a second stratified charge combustion.

Regarding this control apparatus for the direct-injection spark-ignition internal combustion engine, the air-fuel ratio of the air-fuel mixture layer around the spark plug is set to be rich rather than stoichiometric, and thus an incomplete combustion product (CO) is generated in a main combustion process (ignition by spark and subsequent combustion through flame propagation) and this CO remains in the combustion chamber after the main combustion. Further, since the air-fuel mixture generated around the rich air-fuel mixture is lean rather than stoichiometric, oxygen remains in this region after the main combustion. Flow of gases in the cylinder after the main combustion causes the remaining CO and the remaining oxygen to be mixed and re-burned, resulting in an increase in exhaust temperature. Since the incomplete combustion product (CO) is generated in the process of main combustion, the incomplete combustion product has already been in a high-temperature state when the main combustion is completed. Therefore, the CO can be burned in a relatively favorable state even under the condition where the combustion-chamber temperature is low. In other words, almost all of the generated CO can be re-burned in the combustion chamber and in the exhaust manifold upstream of the catalyst. Although an increased quantity of CO could flow to the catalyst as compared with homogeneous charge combustion which generates a smaller quantity of CO in the main combustion itself, the catalyst starts CO conversion at a temperature lower than the HC conversion starting temperature and thus exhaust emissions are influenced to a relatively small degree. Further, since the air-fuel ratio of the lean air-fuel mixture layer is set to an air-fuel ratio at which flame can be propagated, un-burned HC is not generated at the boundary between the rich air-fuel mixture layer and the lean air-fuel mixture layer. Furthermore, since the flame is propagated to every corner of the combustion chamber in a favorable state, the low-temperature region (quench area) in the combustion chamber may be a small region which is the same as the one for the homogeneous charge combustion. Moreover, since an excessive quantity of oxygen in a region where the lean air-fuel mixture is burned is left after the main combustion, the temperature of the remaining oxygen when the main combustion is completed is relatively high, so that CO is more quickly re-burned.

Japanese Patent Laying-Open No. 11-324765 discussed above includes a fourth embodiment showing the following structure. Fuel supply means for creating a homogeneous air-fuel mixture in the entire combustion chamber is provided to generate a homogeneous air-fuel mixture that is relatively lean rather than stoichiometric in the whole combustion chamber through fuel injection by means of a fuel injection valve (fuel injection valve for intake port injection) provided in the intake manifold in an exhaust stroke or in a period from an exhaust stroke to an intake stroke. A fuel injection valve for injecting fuel into the cylinder is used to inject and supply fuel into the combustion chamber in a compression stroke and create an air-fuel mixture in a layered form that is relatively rich (high fuel concentration) rather than stoichiometric around the spark plug, and the mixture is burned. For a stratified stoichiometric charge combustion with the purpose of activating a catalyst, fuel is supplied in the following way. Specifically, of the total quantity of fuel that can be almost completely burned with a quantity of intake air per combustion cycle (weight of fuel necessary for achieving a substantially stoichiometric ratio), from approximately 50% to approximately 90% for example of the weight of fuel is injected and supplied into the intake manifold by means of the fuel injection valve for intake port injection (in an exhaust stroke or from exhaust stroke to intake stroke), thereby generating a homogeneous air-fuel mixture that is relatively lean rather than stoichiometric in the entire combustion chamber in an intake stroke. Further, from approximately 50% to approximately 10% of the remaining weight of fuel is injected and supplied into the combustion chamber by means of the fuel injection valve for injecting fuel into the cylinder in a compression stroke, and an air-fuel mixture that is relatively rich (high fuel concentration) rather than stoichiometric around the spark plug is generated in a layered form, and the mixture is burned. In other words, when the catalyst is heated, regarding the fuel injection ratio between the in-cylinder fuel injection valve and the intake manifold fuel injection valve, at least the fuel injection ratio of the intake manifold fuel injection valve is higher.

However, in order to achieve early warm-up of the exhaust catalyst, the aforementioned fuel injection ratio is not optimum for the internal combustion engine having the fuel injection valve for injecting fuel into the cylinder (in-cylinder injector) and the fuel injection valve for injecting fuel into the intake manifold (intake manifold injector). In other words, as to the ignition timing that is the most important factor for catalyst warm-up, a sufficient retard cannot be achieved at such a fuel injection ratio.

SUMMARY OF THE INVENTION

An object of the present invention is to provide a control apparatus for an internal combustion engine having a first fuel injection mechanism for injecting fuel into a cylinder and a second fuel injection mechanism for injecting fuel into an intake manifold, performing, in a favorable manner, rapid warm-up of an exhaust cleaning catalyst at the start of the internal combustion engine to cause no deterioration in emission at the engine start.

According to the present invention, a control apparatus for an internal combustion engine controls the internal combustion engine including a first fuel injection mechanism injecting fuel into a cylinder and a second fuel injection mechanism injecting fuel into an intake manifold. The internal combustion engine has an exhaust system provided with a catalyst that is used for cleaning exhaust and that is activated at a temperature of at least a predetermined temperature. The control apparatus includes: a detection unit detecting a request to warm up the catalyst; a control unit controlling the first and second fuel injection mechanisms, based on conditions required of the internal combustion engine, such that the first and second fuel injection mechanisms partake in fuel injection; and an ignition control unit controlling an ignition device. The control unit controls the first and second fuel injection mechanisms such that the ratio of fuel injection by the first fuel injection mechanism is at least equal to the ratio of fuel injection by the second fuel injection mechanism under the conditions that the first and second fuel injection mechanisms partake in the fuel injection and the request to warm up is detected. The ignition control unit controls the ignition device to retard ignition timing when the request to warm up is detected.

In accordance with the present invention, the ratio of fuel injection by the first fuel injection mechanism (in-cylinder injector for example) is set to be equal to or higher than the ratio of fuel injection by the second fuel injection mechanism (intake manifold injector for example) (the in-cylinder injector performs 65% of the fuel injection for example), and fuel is injected by means of the in-cylinder injector in a compression stroke. Accordingly, in the combustion chamber, a homogeneous air-fuel mixture (air-fuel mixture at a lean air-fuel ratio as a whole) generated by the intake manifold injector as well as a stratified air-fuel mixture (air-fuel mixture at a rich air-fuel ratio around the spark plug) generated by the in-cylinder injector can be created. At this time, in particular, the fuel injection ratio of the in-cylinder injector is equal to or higher than that of the intake manifold injector, and thus the air-fuel ratio of the air-fuel mixture around the spark plug can be made richer. Further, since the air-fuel mixture around the rich mixture is the homogeneous air-fuel mixture, flame can be propagated in a favorable state. In other words, in the state where fuel is sprayed, even at the boundary between the air-fuel mixture layer with the rich air-fuel ratio around the spark plug and the homogeneous air-fuel mixture, any region where the air-fuel ratio becomes lean due to diffusion of the fuel does not partially occur. Since such a region is not generated, flame is easily propagated and unburned fuel (HC) is unlikely to be generated. In such a state, the ignition timing can be retarded to a large degree and the exhaust temperature can easily be increased. It is considered that the exhaust temperature is increased for the following reason. The air-fuel ratio of the air-fuel mire around the spark plug is rich rather than stoichiometric, so that an incomplete combustion product (CO) is generated in a main combustion process (ignition by spark generated by the spark plug and subsequent combustion through propagation of flame) and this CO remains in the combustion chamber after the main combustion. In the homogeneous air-fuel mixture with the lean air-fuel ratio located around the air-fuel mixture at the rich air-fuel ratio, oxygen remains after the main combustion. The remaining CO and the remaining oxygen are mixed through gas flow in the cylinder and then burned again, causing the exhaust temperature to increase. Since the exhaust temperature increases, in the period from the engine start to activation of the catalyst, emission of HC into the atmosphere can be suppressed. Meanwhile, the catalyst can rapidly be warmed up to be activated at an early stage. In this way, there can be provided a control apparatus for an internal combustion engine having a first fuel injection mechanism injecting fuel into a cylinder and a second fuel injection mechanism injecting fuel into an intake manifold, performing rapid warm-up of an exhaust cleaning catalyst at engine start in a favorable manner to cause no deterioration in emission at the start.

Preferably, the control unit controls the first fuel injection mechanism to inject fuel in a compression stroke.

In accordance with the present invention, the fuel injected in the compression stroke from the in-cylinder injector can create an air-fuel mixture having a relatively rich air-fuel ratio (approximately 15.5 for example) around the spark plug. Thus, the ignition timing can considerably be retarded and the exhaust temperature can be increased to rapidly warm up the catalyst and thereby activate the catalyst at an early stage.

Still preferably, the control apparatus further includes an output control unit controlling the internal combustion engine to prevent output of the internal combustion engine from decreasing when the internal combustion engine is controlled according to the request to warm up.

In accordance with the present invention, although retardation of the ignition timing according to the request to warm up causes output of the internal combustion engine to decrease (torque down), such torque down can be avoided by the output control unit. Thus, the torque down due to retardation of the ignition timing can be avoided.

Still preferably, the output control unit prevents output of the internal combustion engine from decreasing by increasing the quantity of injected fuel that is supplied to the internal combustion engine.

In accordance with the present invention, torque down of the internal combustion engine that occurs when the ignition timing is retarded according to the request to warm up can be prevented by increasing the quantity of injected fuel.

Still preferably, the output control unit prevents output of the internal combustion engine from decreasing by increasing the quantity of air supplied to the internal combustion engine.

In accordance with the present invention, torque down of the internal combustion engine that occurs when the ignition timing is retarded according to the request to warm up can be prevented by increasing the quantity of supplied air.

Still preferably, the control apparatus further includes a temperature detector detecting the temperature of the internal combustion engine. The temperature detector detects that, when the temperature of the internal combustion engine is lower than a predetermined temperature, the request to warm up is given.

In accordance with the present invention, when the temperature of the internal combustion engine (the temperature may be estimated from the temperature of the coolant of the internal combustion engine) is low, it can be determined that the catalyst is also cold and thus un-activated. Accordingly, it can be detected that the request to warm up is made.

Still preferably, the first fuel injection mechanism is an in-cylinder injector and the second fuel injection mechanism is an intake manifold injector.

In accordance with the present invention, for the internal combustion engine separately including the in-cylinder injector that is the first fuel injection mechanism and the intake manifold injector that is the second fuel injection mechanism to allow fuel injection to be performed by both injectors, a control apparatus can be provided to perform, in a favorable manner, rapid warm-up of the exhaust cleaning catalyst at the start of the internal combustion engine to cause no deterioration in emission at the start.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows conditions for rapid catalyst warm-up in the embodiment of the present invention.

DESCRIPTION OF THE PREFERRED EMBODIMENTS

Figure 1:
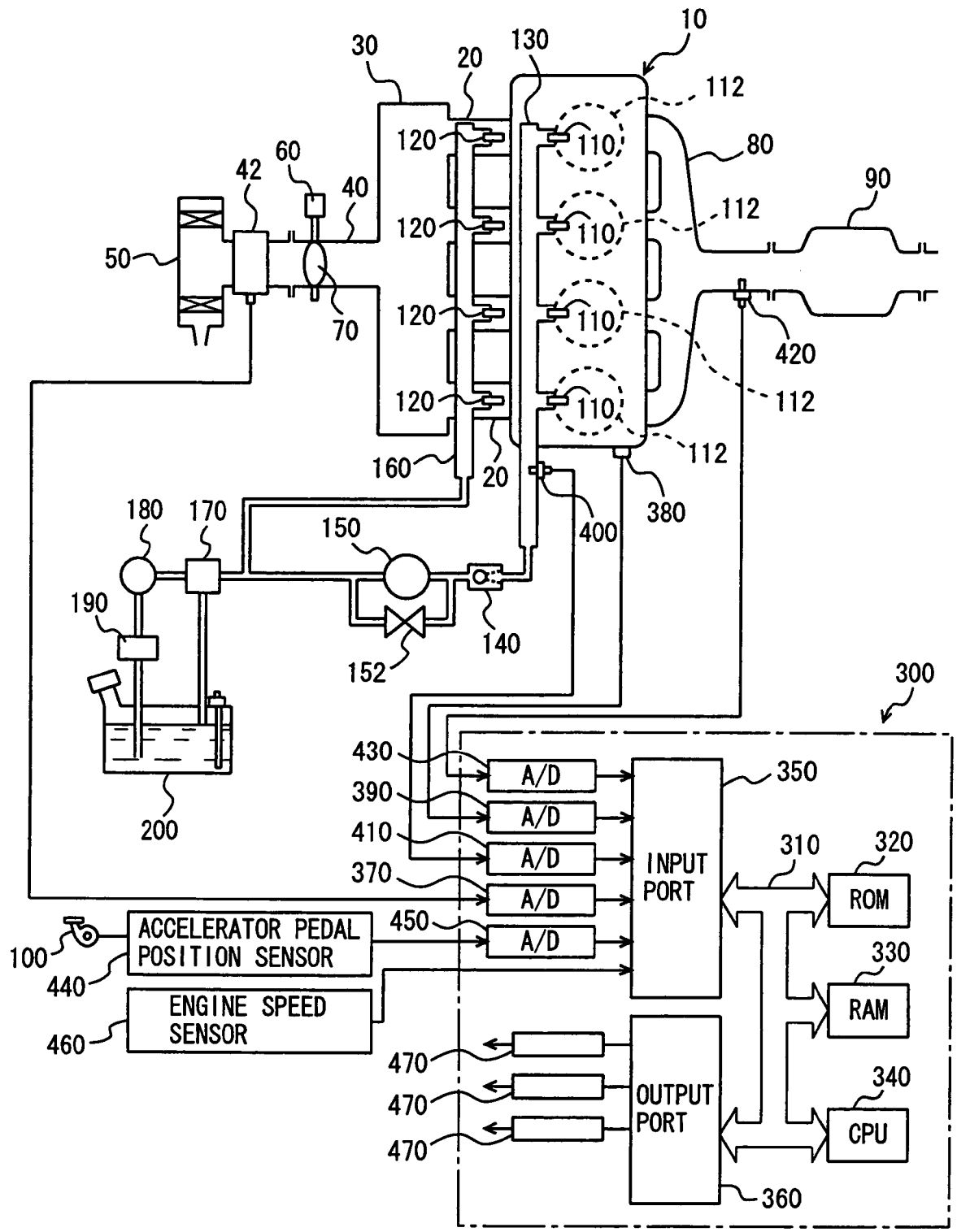
FIG. 1 is a schematic of a structure of an engine system controlled by a control apparatus according to an embodiment of the present invention.

Embodiments of the present invention are hereinafter described with reference to the drawings. In the following description, like components are denoted by like reference characters, and these components are named identically and function identically. Therefore, a detailed description thereof is not repeated.

FIG. 1 is a schematic of a structure of an engine system controlled by an engine ECU (Electronic Control Unit) identified as a control apparatus for an internal combustion engine according to an embodiment of the present invention. Although an in-line 4-cylinder gasoline engine is shown in FIG. 1 as the engine, the present invention is not limited to such an engine.

As shown in FIG. 1, engine 10 includes four cylinders 112, each connected to a common surge tank 30 via a corresponding intake manifold 20. Surge tank 30 is connected via an intake duct 40 to an air cleaner 50. In intake duct 40, an airflow meter 42 is placed and a throttle valve 70 driven by an electric motor 60 is also placed. Throttle valve 70 has its degree of opening controlled based on an output signal of an engine ECU 300, independently of an accelerator pedal 100. Each cylinder 112 is connected to a common exhaust manifold 80, which is in turn connected to a three-way catalytic converter 90.

For each cylinder 112, an in-cylinder injector 110 for injecting fuel into the cylinder and an intake manifold injector 120 for injecting fuel into an intake port or/and an intake manifold are provided. Injectors 110 and 120 are controlled based on output signals from engine ECU 300. Further, each in-cylinder injector 110 is connected to a common fuel delivery pipe 130. Fuel delivery pipe 130 is connected to a high-pressure fuel pump 150 of an engine-driven type, via a check valve 140 that allows a flow in the direction toward fuel delivery pipe 130. Although an internal combustion engine having two injectors separately provided is explained in connection with the present embodiment, the present invention is not restricted to such an internal combustion engine. For example, the internal combustion engine may have one injector that can effect both in-cylinder injection and intake manifold injection.

As shown in FIG. 1, the discharge side of high-pressure fuel pump 150 is connected via an electromagnetic spill valve 152 to the intake side of high-pressure fuel pump 150. As the degree of opening of electromagnetic spill valve 152 is smaller, the quantity of fuel supplied from high-pressure fuel pump 150 into fuel delivery pipe 130 increases. When electromagnetic spill valve 152 is fully opened, the fuel supply from high-pressure fuel pump 150 to fuel delivery pipe 130 is ceased. Electromagnetic spill valve 152 is controlled based on an output signal of engine ECU 300.

Each intake manifold injector 120 is connected to a common fuel delivery pipe 160 at the low-pressure side. Fuel delivery pipe 160 and high-pressure fuel pump 150 are connected to an electromotor-driven-type low-pressure fuel pump 180 via a common fuel pressure regulator 170. Low-pressure fuel pump 180 is connected to a fuel tank 200 via a fuel filter 190. When the fuel pressure of fuel ejected from low-pressure fuel pump 180 becomes higher than a predetermined set fuel pressure, fuel pressure regulator 170 returns a portion of the fuel ejected from low-pressure fuel pump 180 to fuel tank 200. Accordingly, the fuel pressure supplied to intake manifold injector 120 and the fuel pressure supplied to high-pressure fuel pump 150 are prevented from becoming higher than the set fuel pressure.

Engine ECU 300 is configured with a digital computer, and includes a ROM. (Read-Only Memory) 320, a RAM (Random Access Memory) 330, a CPU (Central Processing Unit) 340, an input port 350, and an output port 360 connected to each other via a bidirectional bus 310.

Airflow meter 42 generates an output voltage in proportion to the quantity of intake air. The output voltage of airflow meter 42 is applied to input port 350 via an A/D converter 370. A coolant temperature sensor 380 generating an output voltage in proportion to the engine coolant temperature is attached to engine 10. The output voltage of coolant temperature sensor 380 is applied to input port 350 via an A/D converter 390.

A fuel pressure sensor 400 generating an output voltage in proportion to the fuel pressure in fuel delivery pipe 130 is attached to fuel delivery pipe 130. The output voltage of fuel pressure sensor 400 is applied to input port 350 via an A/D converter 410. An air-fuel ratio sensor 420 generating an output voltage in proportion to the oxygen concentration in the exhaust gas is attached to exhaust manifold 80 upstream of 3-way catalytic converter 90. The output voltage of air-fuel ratio sensor 420 is applied to input port 350 via an A/D converter 430.

Air-fuel ratio sensor 420 in the engine system of the present embodiment is a full-range air-fuel ratio sensor (linear air-fuel ratio sensor) generating an output voltage in proportion to the air-fuel ratio of an air-fuel mixture burned in engine 10. Air-fuel ratio sensor 420 may be an $O_2$ sensor that detects whether the air-fuel ratio of the air-fuel mixture burned in engine 10 is rich or lean with respect to the stoichiometric ratio in an on/off manner.

Accelerator pedal 100 is connected to an accelerator pedal position sensor 440 generating an output voltage in proportion to the pedal position of accelerator pedal 100. The output voltage of accelerator pedal position sensor 440 is applied to input port 350 via an A/D converter 450. To input port 350, an engine speed sensor 460 generating an output pulse representing the engine speed is connected. ROM 320 of engine ECU 300 stores the value of the fuel injection quantity set corresponding to an operation state, a correction value based on the engine coolant temperature, and the like that are mapped in advance based on the engine load factor and the engine speed obtained through accelerator pedal position sensor 440 and engine speed sensor 460 set forth above.

Three-way catalytic converter 90 can oxidize CO and HC and reduce NOx in exhaust gases when the air-fuel ratio is near the stoichiometric air-fuel ratio (A/F (air weight/fuel weight)=14.7), thereby cleaning the exhaust gases. The catalyst (platinum, rhodium, paradigm for example) of this three-way catalytic converter 90 is not activated and thus does not exhibit the cleaning ability until reaching a certain (high) temperature.

The control apparatus of the present embodiment increases the temperature of three-way catalytic converter 90 at an early stage to activate the catalyst, after engine 10 having in-cylinder injector 110 and intake manifold injector 120 is started, thereby effecting cleaning of exhaust gases as early as possible immediately after engine 10 is started. Whether or not three-way catalytic converter 90 is activated can be determined by detecting the concentration of a specific component (for example oxygen) in exhaust gases at the downstream of the exhaust gases of three-way catalytic converter 90. For example, it is determined whether or not an oxygen sensor provided downstream of three-way catalytic converter 90 is activated. Specifically, whether or not three-way catalytic converter 90 is activated is determined based on a change in detection signal of the downstream oxygen sensor. Since the activation of the oxygen sensor provided downstream of three-way catalytic converter 90 is caused by an increase in temperature of exhaust gases (oxidation) on the outlet side of activation of three-way catalytic converter 90, it is determined that three-way catalytic converter 90 is activated based on the fact that the oxygen sensor is activated.

Alternatively, the temperature of the engine coolant or the temperature of the engine oil for example may be detected to estimate the temperature of three-way catalytic converter 90 and accordingly determine whether or not three-way catalytic converter 90 is activated based on the result of the estimation. Further, the temperature of three-way catalytic converter 90 (outlet temperature) may directly be detected to determine whether or not three-way catalytic converter 90 is activated.

In this engine 10, in-cylinder injector 110 and intake manifold injector 120 partake in or share the injection of fuel. A description is now given of a map that is stored in ROM 320 of engine ECU 300 and that represents the fuel injection ratio between in-cylinder injector 110 and intake manifold injector 120 (hereinafter also referred to as direct injection ratio, DI ratio, DI ratio r (or simply r)). This map has its horizontal axis representing the engine speed and its vertical axis representing the load factor to indicate, as the direct injection ratio (DI ratio r), the ratio of fuel injection by in-cylinder injector 110 expressed in percentage.

For each of operating regions determined by the engine speed and load factor, a direct-injection ratio (DI ratio r) is set. "Direct injection 100%" means that the region is a region where fuel is injected from in-cylinder injector 110 only (r=1.0, r=100%). "Direct injection 0-20%" means that the region is a region where 0 to 20% of the total quantity of injected fuel is injected from in-cylinder injector 110 (r=0-0.2). For example, "direct injection 40%" means that 40% of the total quantity of injected fuel is injected from in-cylinder injector 120 while the remaining 60% of the total quantity of injected fuel is injected from intake manifold injector 120. Details of this map are given hereinlater.

Figure 2:
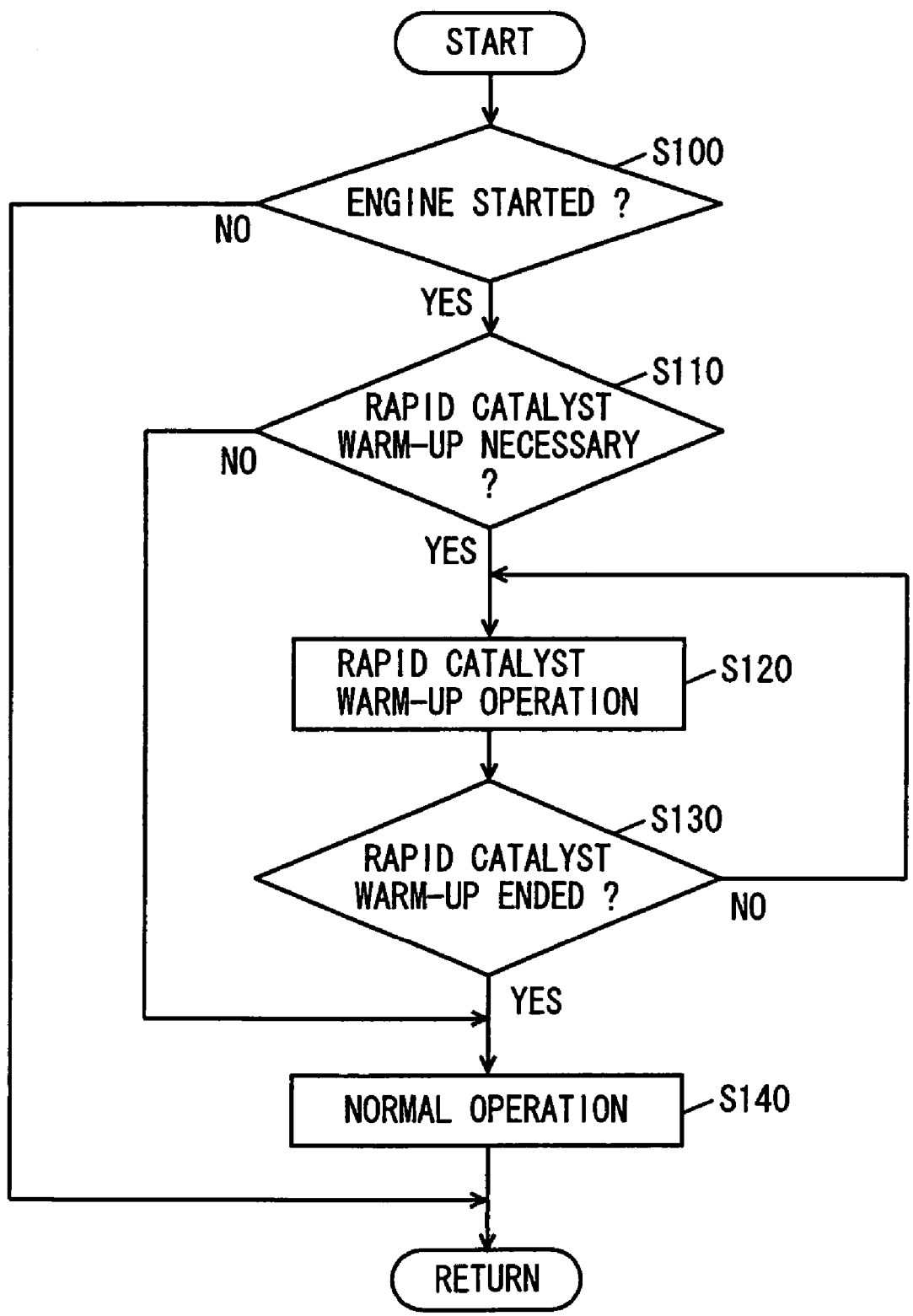
FIG. 2 is a flowchart showing a control structure of a program executed by an engine ECU identified as the control apparatus of the embodiment of the present invention.

Referring to FIG. 2, a control structure of a program is described that is executed by engine ECU 300 identified as the control apparatus in the embodiment of the present invention.

In step (hereinafter "step" is abbreviated as "S") 100, engine ECU 300 determines whether or not engine 10 is started. At this time, the determination is made based on an engine start request signal that is input to engine ECU 300 from another ECU and/or the results of processing by engine ECU 300 itself. As engine 10 is started (YES in S100), the process proceeds to S110. If not (NO in S100), this process is ended.

In S110, engine ECU 300 determines whether or not rapid catalyst warm-up is necessary. At this time, as described above, if it is found, from a change in the detection signal of the oxygen sensor provided downstream of three-way catalytic converter 90, that three-way catalytic converter 90 is not activated, it is determined that the rapid catalyst warm-up is necessary. Alternatively, from the temperature of the engine coolant or the temperature of the engine oil, it may be determined whether or not the rapid catalyst warm-up is necessary. When the rapid catalyst warm-up is necessary (YES in S110), the process proceeds to S120. If not (NO in S110), the process proceeds to S140.

In S120, engine ECU 300 performs an operation for the rapid catalyst warm-up. At this time, for example, as shown in FIG. 3, engine ECU 300 controls the ignition timing, the injection timing by in-cylinder injector 110, the quantity of injected fuel, the quantity of supplied air, and the DI ratio r. The numerical values of the DI ratio indicated in FIG. 3 are exemplary ones and the DI ratio may be at least 50% (the ratio of fuel injection by in-cylinder injector 110 is equivalent to or higher than the ratio of fuel injection by intake manifold injector 120). Further, regarding the decrease in fuel quantity, the air-fuel ratio of exhaust gases may be for example approximately 15.5 corresponding to a lean state. By this decrease, unburned HC is also decreased. While a correction for increase is made immediately after engine 10 is started (an increase correction for addressing a request for torque when engine 10 is started or an increase correction for addressing sticking of fuel to the wall surface), the fuel quantity is decreased since the torque requested at the engine start becomes unnecessary after certain time has passed since the engine start or the fuel sticking to the wall surface is saturated. Thus, even if the quantity of fuel injected in a compression stroke from in-cylinder injector 110 is decreased, only the quantity of fuel necessary for ignition is present around the spark plug and a high lean limit is kept so that no misfire occurs. Fuel for post combustion of a requested quantity that contributes to catalyst warm-up (fuel supplied from intake manifold injector 120) is supplied (by the increase correction). The supplied post-combustion fuel can be used to warm up the catalyst.

In S130, engine ECU 300 determines whether or not the rapid catalyst warm-up should be ended. At this time, as described above, if it is found, from a change in detection signal of the oxygen sensor provided downstream of three-way catalyst converter 90, that three-way catalyst converter 90 is activated, it is determined that the rapid catalyst warm-up is to be ended. Alternatively, from the temperature of the engine coolant or the temperature of the engine oil for example, the determination as to whether or not the rapid catalyst warm-up should be ended may be made. Further, alternatively, depending on whether or not the temperature of the engine coolant has reached a predetermined temperature or higher relative to the temperature at the engine start, it may be determined whether or not the rapid catalyst warm-up should be ended. Furthermore, alternatively, based on the total quantity of intake air, the determination as to whether or not engine 10 has been operating for a predetermined time or more may be made to determine whether or not the rapid catalyst warm-up should be ended. When it is determined that the rapid catalyst warm-up is to be ended (YES in S130), the process proceeds to S140. If not (NO in S130), the process returns to S120.

In S140, engine ECU 300 performs a normal operation for engine 10. At this time, the ignition timing, the injection timing of in-cylinder injector 110, the quantity of injected fuel, the quantity of supplied air and the DI ratio r that are temporarily set for the rapid catalyst warm-up are set back to those for the normal operation by engine ECU 300.

A description is now given of an operation of engine 10 controlled by engine ECU 300 identified as the control apparatus of the present embodiment, based on the above-described structure and flowchart. In the following, the description is given of the operation at start-up of engine 10 in the case where rapid catalyst warm-up is necessary.

Under the conditions that engine 10 is started (YES in S100) and it is found from a change in the detection signal of the oxygen sensor provided downstream of three-way catalytic converter 90 that three-way catalyst converter 90 is not activated, it is determined that the rapid catalyst warm-up is necessary (YES in S110). In such a case, engine ECU 300 controls the ignition timing, the injection timing of in-cylinder injector 110, the quantity of injected fuel, the quantity of supplied air and the DI ratio r so that they have respective values as shown in FIG. 3.

In the engine controlled in such a manner as described above, the ratio of fuel injection by in-cylinder injector 110 is set to be equivalent to that by intake manifold injector 120 or to be higher than that, approximately 65%, to inject fuel into the cylinder in a compression stroke from in-cylinder injector 110. From intake manifold injector 120, fuel is injected into the intake manifold in an intake stroke. At this time, an air-fuel mixture that is produced by intake-manifold injector 120, entirely lean in air-fuel ratio and in a homogeneous state as well an air-fuel mixture that is produced by in-cylinder injector 110, rich in air-fuel ratio around the spark plug and in a stratified state are created in the combustion chamber. Even if the ignition timing at the spark plug is retarded to a large degree (for example, 15° ATDC), the fuel injection ratio of in-cylinder injector 110 is equal to or higher than the fuel injection ratio of intake manifold injector 120, thus the air-fuel ratio of the air-fuel mixture around the spark plug is richer, and this air-fuel mixture around the spark plug is surrounded by the homogeneous air-fuel mixture produced by intake manifold injector 120, so that flame can be propagated in a favorable state. Thus, flame is smoothly propagated and unburned fuel (HC) is unlikely to be generated. The large retard of the ignition timing allows the exhaust temperature to increase. Although the large retard of the ignition timing causes the output (torque) of engine 10 to decrease, the fuel quantity is decreased to decrease unburned HC or the quantity of intake air is increased to avoid torque down. By the increase of the exhaust temperature, emission of HC into the atmosphere in the period from the engine start to activation of the catalyst is reduced while the catalyst is rapidly warmed up so that the catalyst can rapidly be activated.

As the temperature of the catalyst of three-way catalytic converter 90 is increased to be activated, the detection signal of the oxygen sensor provided downstream of three-way catalytic converter 90 changes. Based on this change, it is determined that three-way catalytic converter 90 is activated (YES in S130), and the rapid catalyst warm-up is ended. Then, instead of the ignition timing, the injection timing of in-cylinder injector 110, the quantity of injected fuel, the quantity of supplied air and the DI ratio r, the DI ratio r for example described hereinlater is used to control engine 10.

As described above, when the engine of a vehicle having the engine ECU of the present embodiment is started and rapid warm-up of the exhaust cleaning catalyst is necessary, the ratio of fuel injection by the in-cylinder injector is set to be equivalent to or higher than the ratio of fuel injection by the intake manifold injector. Accordingly, in the combustion chamber, an air-fuel mixture that is generated by the intake manifold injector, entirely lean in air-fuel ratio and in a homogeneous state as well as an air-fuel mixture that is generated by the in-cylinder injector, rich in air-fuel ratio around the spark plug and in a stratified state can be produced. At this time, the air-fuel ratio around the spark plug can be made richer. Since the air-fuel mixture around the spark plug is homogeneous (semi-stratified), flame propagation is facilitated and unburned fuel (HC) is unlikely to be generated. In such a state, the ignition timing is retarded to a large degree to enable the exhaust cleaning catalyst to be warmed up more rapidly as compared with the conventional art.

<Engine (1) to which Present Control Apparatus is Suitably Applied>

An engine (1) to which the control apparatus of the present embodiment is suitably applied will be described hereinafter.

Figure 4:
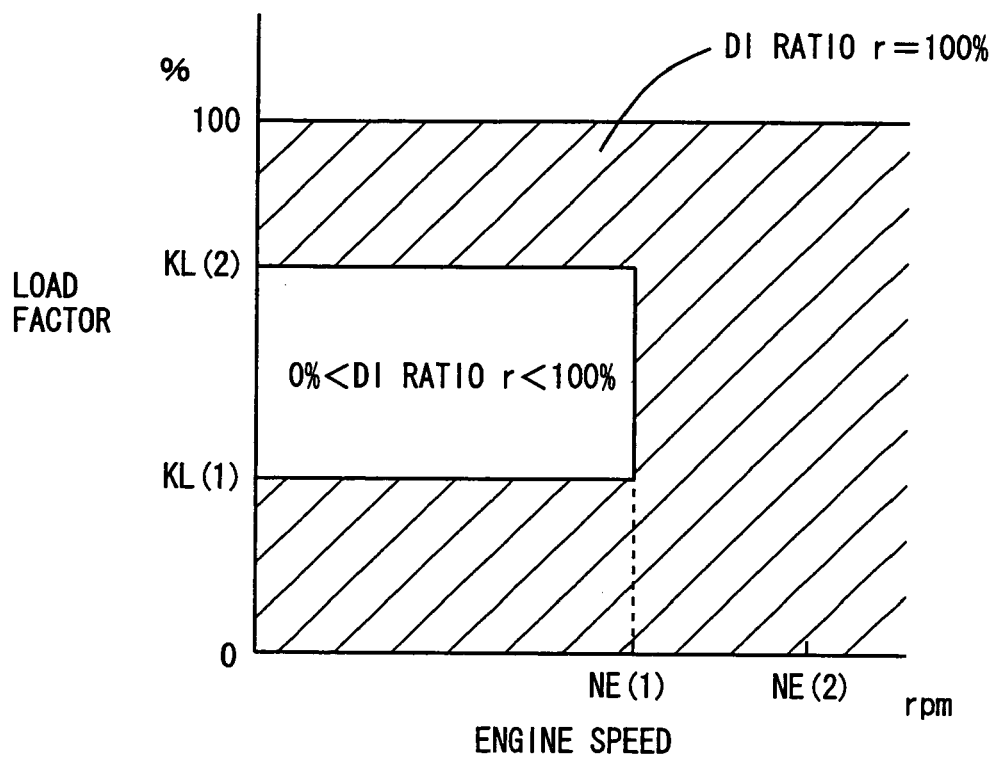
FIG. 4 represents a DI ratio map corresponding to a warm state of an engine (1) to which the control apparatus of the embodiment of the present invention is suitably applied.
Figure 5:
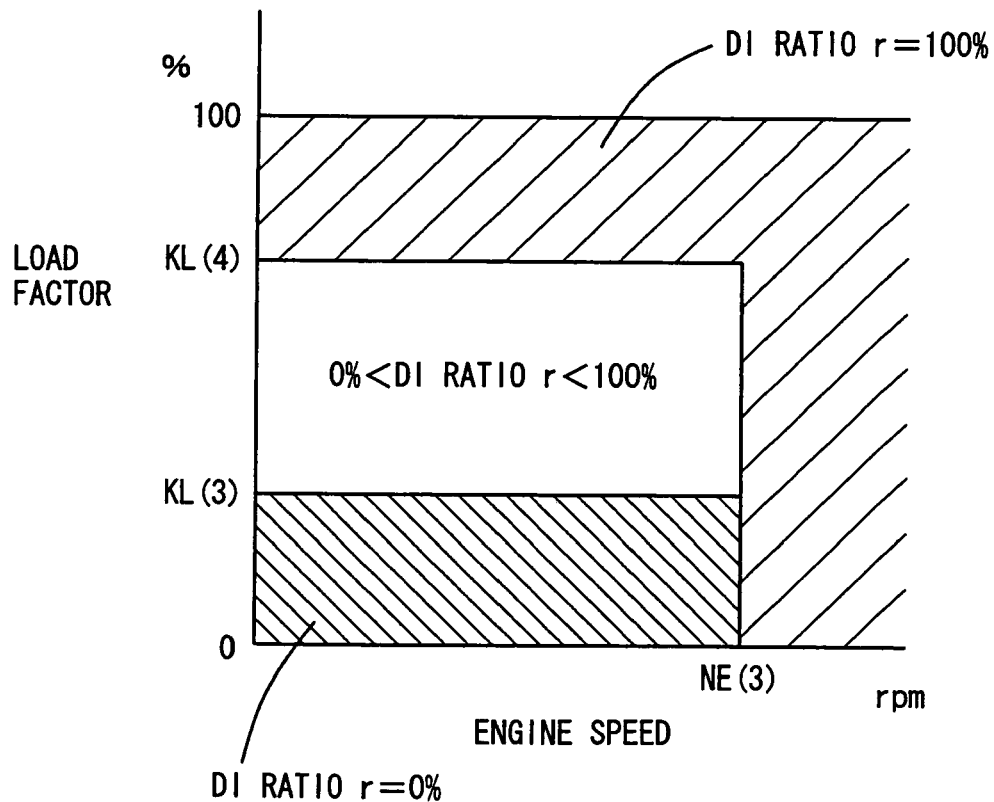
FIG. 5 represents a DI ratio map corresponding to a cold state of the engine (1) to which the control apparatus of the embodiment of the present invention is suitably applied.

Referring to FIGS. 4 and 5, maps indicating a fuel injection ratio (hereinafter, also referred to as DI ratio r or simply as r) between in-cylinder injector 110 and intake manifold injector 120, identified as information associated with an operation state of engine 10, will now be described. The maps are stored in an ROM 320 of an engine ECU 300. FIG. 4 is the map for a warm state of engine 10, and FIG. 5 is the map for a cold state of engine 10.

In the maps of FIGS. 4 and 5, the fuel injection ratio of in-cylinder injector 110 is expressed in percentage as the DI ratio r, wherein the engine speed of engine 10 is plotted along the horizontal axis and the load factor is plotted along the vertical axis.

As shown in FIGS. 4 and 5, the DI ratio r is set for each operation region that is determined by the engine speed and the load factor of engine 10. "DI RATIO r=100%" represents the region where fuel injection is carried out from in-cylinder injector 110 alone, and "DI RATIO r=0%" represents the region where fuel injection is carried out from intake manifold injector 120 alone. "DI RATIO r≠0%", "DI RATIO r≠100%" and "0%<DI RATIO r<100%" each represent the region where in-cylinder injector 110 and intake manifold injector 120 partake in fuel injection. Generally, in-cylinder injector 110 contributes to an increase of power performance, whereas intake manifold injector 120 contributes to uniformity of the air-fuel mixture. These two types of injectors having different characteristics are appropriately selected depending on the engine speed and the load factor of engine 10, so that only homogeneous charge combustion is conducted in the normal operation state of engine 10 (for example, a catalyst warm-up state during idling is one example of an abnormal operation state).

Further, as shown in FIGS. 4 and 5, the DI ratio r of in-cylinder injector 110 and intake manifold injector 120 is defined individually in the maps for the warm state and the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 4 is selected; otherwise, the map for the cold state shown in FIG. 5 is selected. In-cylinder injector 110 and/or intake manifold injector 120 are controlled based on the engine speed and the load factor of engine 10 in accordance with the selected map.

The engine speed and the load factor of engine 10 set in FIGS. 4 and 5 will now be described. In FIG. 4, NE(1) is set to 2500 rpm to 2700 rpm, KL(1) is set to 30% to 50%, and KL(2) is set to 60% to 90%. In FIG. 5, NE(3) is set to 2900 rpm to 3100 rpm. That is, NE(1)<NE(3). NE(2) in FIG. 4 as well as KL(3) and KL(4) in FIG. 5 are also set appropriately.

In comparison between FIG. 4 and FIG. 5, NE(3) of the map for the cold state shown in FIG. 5 is greater than NE(1) of the map for the warm state shown in FIG. 4. This shows that, as the temperature of engine 10 becomes lower, the control region of intake manifold injector 120 is expanded to include the region of higher engine speed. That is, in the case where engine 10 is cold, deposits are unlikely to accumulate in the injection hole of in-cylinder injector 110 (even if fuel is not injected from in-cylinder injector 110). Thus, the region where fuel injection is to be carried out using intake manifold injector 120 can be expanded, whereby homogeneity is improved.

In comparison between FIG. 4 and FIG. 5, "DI RATIO r=100%" is shown in the region where the engine speed of engine 10 is NE(1) or higher in the map for the warm state, and in the region where the engine speed is NE(3) or higher in the map for the cold state. In terms of load factor, "DI RATIO r=100%" is shown in the region where the load factor is KL(2) or greater in the map for the warm state, and in the region where the load factor is KL(4) or greater in the map for the cold state. This means that in-cylinder injector 110 alone is used in the region of a predetermined high engine speed, and in the region of a predetermined high engine load. That is, in the high speed region or the high load region, even if fuel injection is carried out through in-cylinder injector 110 alone, the engine speed and the load of engine 10 are so high and the intake air quantity so sufficient that it is readily possible to obtain a homogeneous air-fuel mixture using only in-cylinder injector 110. In this manner, the fuel injected from in-cylinder injector 110 is atomized in the combustion chamber involving latent heat of vaporization (or, absorbing heat from the combustion chamber). Thus, the temperature of the air-fuel mixture is decreased at the compression end, so that the anti-knocking performance is improved. Further, since the temperature in the combustion chamber is decreased, intake efficiency is improved, leading to high power.

In the map for the warm state in FIG. 4, fuel injection is also carried out using in-cylinder injector 110 alone when the load factor is KL(1) or less. This shows that in-cylinder injector 110 alone is used in a predetermined low-load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, in which case accumulation of deposits is prevented. Further, clogging at in-cylinder injector 110 may be prevented while ensuring the minimum fuel injection quantity thereof. Thus, in-cylinder injector 10 solely is used in the relevant region.

In comparison between FIG. 4 and FIG. 5, the region of "DI RATIO r=0%" is present only in the map for the cold state of FIG. 5. This shows that fuel injection is carried out through intake manifold injector 120 alone in a predetermined low-load region (KL(3) or less) when the temperature of engine 10 is low. When engine 10 is cold and low in load and the intake air quantity is small, the fuel is less susceptible to atomization. In such a region, it is difficult to ensure favorable combustion with the fuel injection from in-cylinder injector 110. Further, particularly in the low-load and low-speed region, high power using in-cylinder injector 110 is unnecessary. Accordingly, fuel injection is carried out through intake manifold injector 120 alone, without using in-cylinder injector 110, in the relevant region.

Further, in an operation other than the normal operation, or, in the catalyst warm-up state during idling of engine 10 (an abnormal operation state), in-cylinder injector 110 is controlled such that stratified charge combustion is effected. By causing the stratified charge combustion only during the catalyst warm-up operation, warming up of the catalyst is promoted to improve exhaust emission.

<Engine (2) to which Present Control Apparatus is Suitably Applied>

An engine (2) to which the control apparatus of the present embodiment is suitably applied will be described hereinafter. In the following description of the engine (2), the configurations similar to those of the engine (1) will not be repeated.

Figure 6:
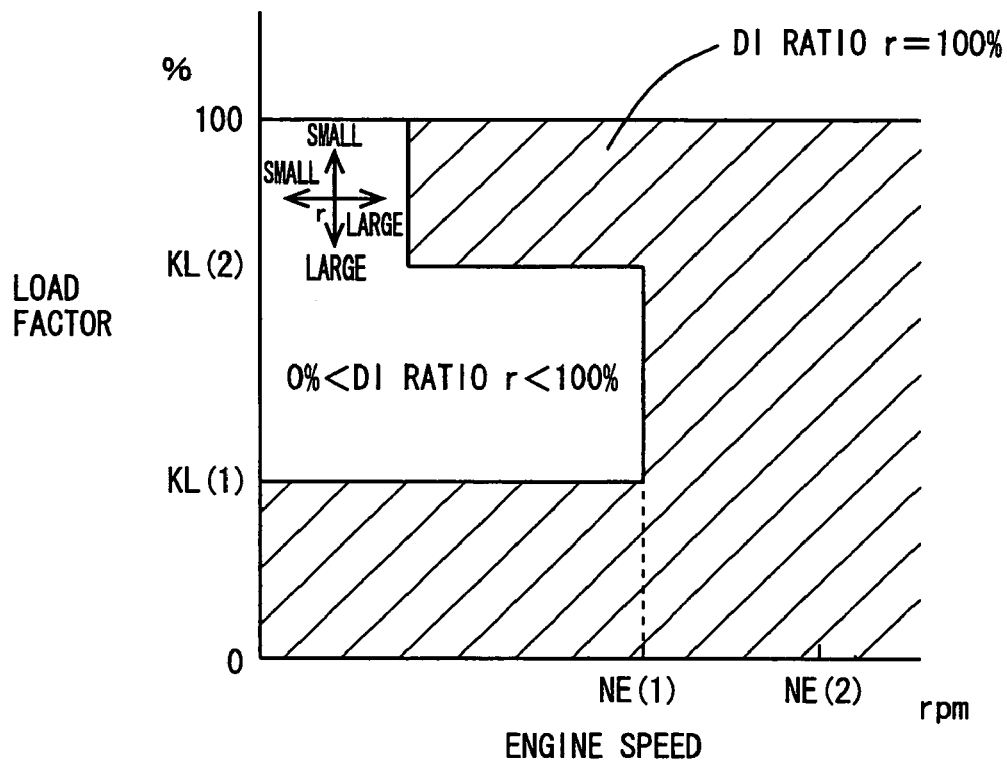
FIG. 6 represents a DI ratio map corresponding to a warm state of an engine (2) to which the control apparatus of the embodiment of the present invention is suitably applied.
Figure 7:
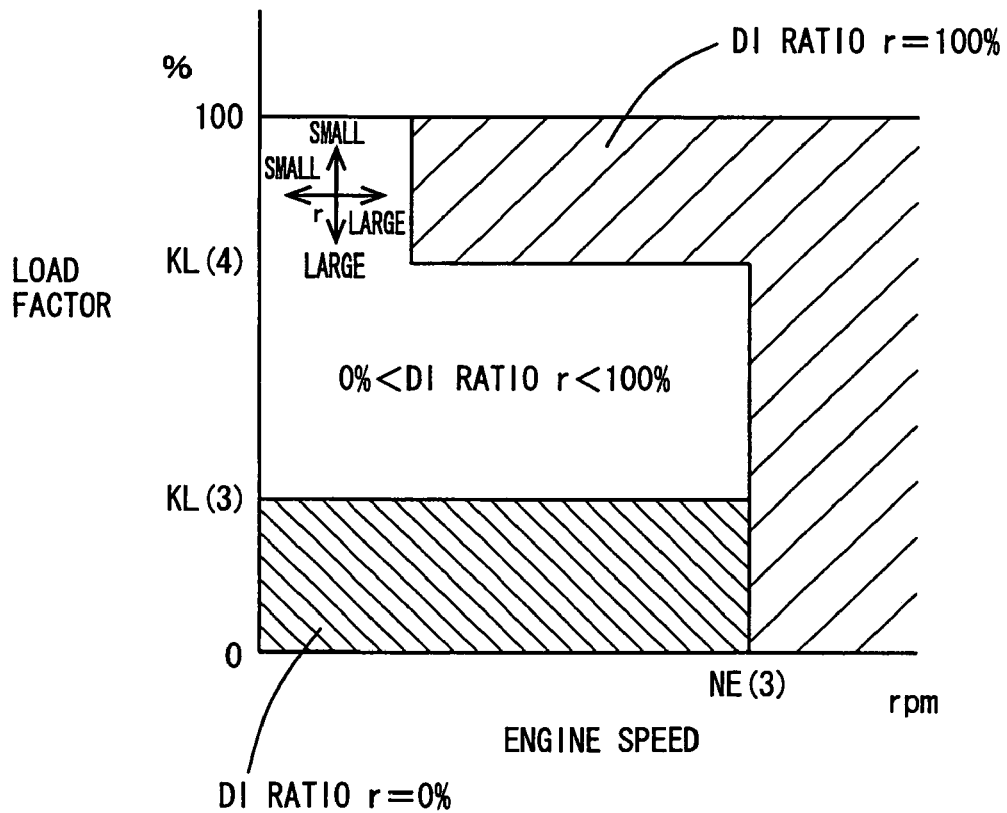
FIG. 7 represents a DI ratio map corresponding to a cold state of the engine (2) to which the control apparatus of the embodiment of the present invention is suitably applied.

Referring to FIGS. 6 and 7, maps indicating the fuel injection ratio between in-cylinder injector 110 and intake manifold injector 120, identified as information associated with the operation state of engine 10, will be described. The maps are stored in ROM 320 of an engine ECU 300. FIG. 6 is the map for the warm state of engine 10, and FIG. 6 is the map for the cold state of engine 10.

FIGS. 6 and 7 differ from FIGS. 4 and 5 in the following points. "DI RATIO r=100%" holds in the region where the engine speed of engine 10 is equal to or higher than NE(1) in the map for the warm state, and in the region where the engine speed is NE(3) or higher in the map for the cold state. Further, "DI RATIO r=100%" holds in the region, excluding the low-speed region, where the load factor is KL(2) or greater in the map for the warm state, and in the region, excluding the low-speed region, where the load factor is KL(4) or greater in the map for the cold state. This means that fuel injection is carried out through in-cylinder injector 110 alone in the region where the engine speed is at a predetermined high level, and that fuel injection is often carried out through in-cylinder injector 110 alone in the region where the engine load is at a predetermined high level. However, in the low-speed and high-load region, mixing of an air-fuel mixture produced by the fuel injected from in-cylinder injector 110 is poor, and such inhomogeneous air-fuel mixture within the combustion chamber may lead to unstable combustion. Thus, the fuel injection ratio of in-cylinder injector 110 is to be increased as the engine speed increases where such a problem is unlikely to occur, whereas the fuel injection ratio of in-cylinder injector 110 is to be decreased as the engine load increases where such a problem is likely to occur. These changes in the DI ratio r are shown by crisscross arrows in FIGS. 6 and 7. In this manner, variation in output torque of the engine attributable to the unstable combustion can be suppressed. It is noted that these measures are substantially equivalent to the measures to decrease the fuel injection ratio of in-cylinder injector 110 in connection with the state of the engine moving towards the predetermined low speed region, or to increase the fuel injection ratio of in-cylinder injector 110 in connection with the engine state moving towards the predetermined low load region. Further, in a region other than the region set forth above (indicated by the crisscross arrows in FIGS. 6 and 7) and where fuel injection is carried out using only in-cylinder injector 110 (on the high speed side and on the low load side), the air-fuel mixture can be readily set homogeneous even when the fuel injection is carried out using only in-cylinder injector 110. In this case, the fuel injected from in-cylinder injector 110 is atomized in the combustion chamber involving latent heat of vaporization (by absorbing heat from the combustion chamber). Accordingly, the temperature of the air-fuel mixture is decreased at the compression end, whereby the antiknock performance is improved. Further, with the decreased temperature of the combustion chamber, intake efficiency is improved, leading to high power output.

In engine 10 described in conjunction with FIGS. 4-7, homogeneous charge combustion is realized by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be located locally around the spark plug, so that a lean air-fuel mixture in totality is ignited in the combustion chamber to realize the stratified charge combustion. Even if the fuel injection timing of in-cylinder injector 110 is set in the intake stroke, stratified charge combustion can be realized if a rich air-fuel mixture can be located locally around the spark plug.

As used herein, the stratified charge combustion includes both the stratified charge combustion and semi-stratified charge combustion set forth below. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture around the spark plug, so as to improve the combustion state. Such a semi-stratified charge combustion is preferable in the catalyst warm-up operation for the following reasons. In the catalyst warm-up operation, it is necessary to considerably retard the ignition timing and maintain a favorable combustion state (idling state) so as to cause a high-temperature combustion gas to arrive at the catalyst. Further, a certain quantity of fuel must be supplied. If the stratified charge combustion is employed to satisfy these requirements, the quantity of fuel will be insufficient. With the homogeneous charge combustion, the retarded amount for the purpose of maintaining favorable combustion is small as compared to the case of stratified charge combustion. For these reasons, the above-described semi-stratified charge combustion is preferably employed in the catalyst warm-up operation, although either of stratified charge combustion and semi-stratified charge combustion may be employed.

Further, in the engine described in conjunction with FIGS. 4-7, the fuel injection timing by in-cylinder injector 110 is preferably set in the compression stroke for the reason set forth below. It is to be noted that, for most of the fundamental region (here, the fundamental region refers to the region other than the region where semi-stratified charge combustion is carried out with fuel injection from intake manifold injector 120 in the intake stroke and fuel injection from in-cylinder injector 110 in the compression stroke, which is carried out only in the catalyst warm-up state), the fuel injection timing of in-cylinder injector 110 is set at the intake stroke. The fuel injection timing of in-cylinder injector 110, however, may be set temporarily in the compression stroke for the purpose of stabilizing combustion, as will be described hereinafter.

When the fuel injection timing of in-cylinder injector 110 is set in the compression stroke, the air-fuel mixture is cooled by the fuel injection during the period where the temperature in the cylinder is relatively high. This improves the cooling effect and, hence, the antiknock performance. Further, when the fuel injection timing of in-cylinder injector 110 is set in the compression stroke, the time required starting from fuel injection up to the ignition is short, so that the air current can be enhanced by the atomization, leading to an increase of the combustion rate. With the improvement of antiknock performance and the increase of combustion rate, variation in combustion can be obviated to allow improvement in combustion stability.

Furthermore, regardless of the temperature of engine 10 (namely regardless of whether the engine state is the warm state or the cold state), the map for the warm state shown in FIG. 4 or 6 may be used in an off-idle state (when the idle switch is OFF, when the accelerator pedal is depressed) (i.e., regardless of whether the engine state is the cold state or the warm state, in-cylinder injector 100 is used for the low-load region).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an internal combustion engine including a first fuel injection mechanism injecting fuel into a cylinder and a second fuel injection mechanism injecting fuel into an intake manifold, said internal combustion engine having an exhaust system provided with a catalyst that is used for cleaning exhaust and that is activated at a temperature of at least a predetermined temperature, said control apparatus comprising:

a detection unit detecting a request to warm up said catalyst;

a control unit controlling said first and second fuel injection mechanisms, based on conditions required of said internal combustion engine, such that said first and second fuel injection mechanisms partake in fuel injection; and an ignition control unit controlling an ignition device, wherein said control unit controls said first and second fuel injection mechanisms such that the ratio of fuel injection by said first fuel injection mechanism is at least equal to the ratio of fuel injection by said second fuel injection mechanism under the conditions that said first and second fuel injection mechanisms partake in the fuel injection and said request to warm up is detected, and said ignition control unit controls said ignition device to retard ignition timing when said request to warm up is detected.

2. The control apparatus for an internal combustion engine according to claim 1, wherein said control unit controls said first fuel injection mechanism to inject fuel in a compression stroke.

3. The control apparatus for an internal combustion engine according to claim 1, said control apparatus further comprising an output control unit controlling said internal combustion engine to prevent output of said internal combustion engine from decreasing when said internal combustion engine is controlled according to said request to warm up.

4. The control apparatus for an internal combustion engine according to claim 3, wherein said output control unit prevents output of said internal combustion engine from decreasing by increasing the quantity of injected fuel that is supplied to said internal combustion engine.

5. The control apparatus for an internal combustion engine according to claim 3, wherein said output control unit prevents output of said internal combustion engine from decreasing by increasing the quantity of air supplied to said internal combustion engine.

6. The control apparatus for an internal combustion engine according to claim 1, said control apparatus further comprising a temperature detector detecting the temperature of said internal combustion engine, wherein said temperature detector detects that, when the temperature of said internal combustion engine is lower than a predetermined temperature, said request to warm up is given.

7. The control apparatus for an internal combustion engine according to claim 1, wherein said first fuel injection mechanism is an in-cylinder injector and said second fuel injection mechanism is an intake manifold injector.

8. A control apparatus for an internal combustion engine including first fuel injection means for injecting fuel into a cylinder and second fuel injection means for injecting fuel into an intake manifold, said internal combustion engine having an exhaust system provided with a catalyst that is used for cleaning exhaust and that is activated at a temperature of at least a predetermined temperature, said control apparatus comprising:

detection means for detecting a request to warm up said catalyst;

control means for controlling said first and second fuel injection means, based on conditions required of said internal combustion engine, such that said first and second fuel injection means partake in fuel injection; and ignition control means for controlling an ignition device, wherein said control means includes means for controlling said first and second fuel injection means such that the ratio of fuel injection by said first fuel injection means is at least equal to the ratio of fuel injection by said second fuel injection means under the conditions that said first and second fuel injection means partake in the fuel injection and said request to warm up is detected, and said ignition control means includes means for controlling said ignition device to retard ignition timing when said request to warm up is detected.

9. The control apparatus for an internal combustion engine according to claim 8, wherein said control means includes means for controlling said first fuel injection means to inject fuel in a compression stroke.

10. The control apparatus for an internal combustion engine according to claim 8, said control apparatus further comprising output control means for controlling said internal combustion engine to prevent output of said internal combustion engine from decreasing when said internal combustion engine is controlled according to said request to warm up.

11. The control apparatus for an internal combustion engine according to claim 10, wherein said output control means includes means for preventing output of said internal combustion engine from decreasing by increasing the quantity of injected fuel that is supplied to said internal combustion engine.

12. The control apparatus for an internal combustion engine according to claim 10, wherein said output control means includes means for preventing output of said internal combustion engine from decreasing by increasing the quantity of air supplied to said internal combustion engine.

13. The control apparatus for an internal combustion engine according to claim 8, said control apparatus further comprising temperature detection means for detecting the temperature of said internal combustion engine, wherein said temperature detection means includes means for detecting that, when the temperature of said internal combustion engine is lower than a predetermined temperature, said request to warm up is given.

14. The control apparatus for an internal combustion engine according to claim 8, wherein said first fuel injection means is an in-cylinder injector and said second fuel injection means is an intake manifold injector.

* * * * *